Patented June 16, 1936

2,044,747

UNITED STATES PATENT OFFICE 2,044,747

RESINOUS BODIES AND VARNISHES OBTAINED THEREWITH

Karl Ott, Hanns Bernard, and Friedrich Frick, Urdingen, Germany, assignors, by mesne assignments, to E. I. du Pont de Nemours & Company, Wilmington, Del., a corporation of Delaware No Drawing. Application April 17, 1928, Serial No. 270,792

39 Claims. (Cl. 260—8)

The invention relates to resinous bodies and processes of making the same. It also concerns varnishes, lacquers, enamels and other compositions of matter comprising the aforesaid resinous bodies. More especially it relates to a special process of preparing resinous bodies containing the radicles of a polyhydric alcohol, a polybasic organic acid and a monobasic organic acid and to new resinous compounds produced by chemical combination and condensation of a polyhydric alcohol with a polybasic acid or a derivative, particularly an anhydride, thereof and an acid derived from a drying oil.

Polybasic acids or anhydrides thereof are known to yield resinous compounds by esterification with polyhydric alcohols, for example by combining phthalic anhydride with glycerine (glycerol) the so-called polyhydric alcohol-polybasic acid resins are obtained, which are substantially infusible and practically insoluble in all the usual organic solvents employed in the manufacture of lacquers and varnishes. It is also known that resinous bodies are obtained by condensing a polyhydric alcohol with either a mixture of monobasic and polybasic acids or first with a polybasic and subsequently with a monobasic acid.

Our process consists in first preparing a polyhydric alcohol partially acylated by a monobasic acid, that is, an ester of a polyhydric alcohol, such as a glycol, glycerine, or an alcohol obtained by reducing a sugar, with a monobasic acid, such as an aliphatic or aromatic monobasic carboxylic acid or mixtures of acids, for example, the acids occurring in the natural resins, which ester still contains free hydroxy groups, for example monoglycerides or diglycerides, and then condensing this partially acylated alcohol with a polybasic acid, for example, phthalic acid or maleic acid, or an anhydride thereof, to form a resinous compound. The successive order in which the monobasic and polybasic acids are allowed to react upon the polyhydric alcohol exerts a marked influence upon the final product obtained in the process, since the resinous products produced by successive action of a monobasic and a polybasic acid upon a polyhydric alcohol differ considerably from the products obtained by successive action of a polybasic and a monobasic acid upon a polyhydric alcohol.

Partially acylated polyhydric alcohols, on the one hand, can be prepared by esterifying in the well known way a polyhydric alcohol with a quantity of a monobasic acid containing less acid equivalents than is necessary to esterify all the hydroxy groups present in the polyhydric alcohol. On the other hand, a totally acylated alcohol which contains few or no free hydroxy groups, for example, a triglyceride, can be caused to interchange its acid radicals with further polyhydric alcohol and thus be converted into partially acylated compounds, for example, monoglycerides or diglycerides are produced from linseed or China-wood oil by heating it with glycerine. This interchange of acid radicals between a totally acylated polyhydric alcohol and free alcohol which is generally termed alcoholysis is known to be accelerated and promoted by certain catalysts, for example, alcoholates of the alkaline earth metals.

The ratio prevailing in the condensation process between polyhydric alcohol and total quantity or equivalents of acid, and further between polybasic and other organic (monobasic) acid may be varied within wide limits and for this reason resinous products may result which show most various properties and are of different composition. One new resinous compound of remarkably excellent properties corresponding nearly to the formula—

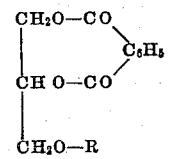

(R being the radical of an acid derived from a drying oil)

is obtained for example from glycerine by using polybasic and other organic (monobasic) acid in such a ratio that the former amounts to about ⅔ (two thirds) of the total acid equivalents present in the mixture. These resinous compounds in a certain degree retain the drying properties of the triglyceride used as starting material, that is, dissolved in a solvent and mixed with a small amount of a drier (a lead, manganese or cobalt soap) they are able to form hard and bright solid coatings. Another important feature of these resinous compounds consists in their ability to form molecular compounds or solid solutions with the polyhydric alcohol-polybasic acid resins previously referred to, which solutions possess particularly valuable properties for the manufacture of cellulose ester varnishes.

It is advantageous in some cases to carry out the condensation process in the presence of specific condensing agents; however we exclude strongly acid condensing agents which indeed have been found to accelerate the condensation but influence the properties of the products obtained in a very unfavorable manner.

Resinous bodies obtained in accordance with the process of this invention are compounds varying from a viscous liquid gum to a hard resin and possess a clear appearance and a pale color ranging from an almost colorless light yellow to a light brown. They have in some cases water-repelling properties and always are resistant to water and soluble in drying and non-drying oils on the one hand, and in solvents and thinners usual in the manufacture of cellulose ester lacquers on the other hand, for example, ethyl acetate, butyl acetate, amyl acetate, glycol ethers, chlorinated hydrocarbons, such as carbon tetrachloride, chloroform etc., acetone, benzene, toluene and mixtures thereof with other substances, for example benzene-alcohol (1:1), Furthermore the resinous compounds are of strongly adhesive nature and yield a highly resistant hard film. It is to be understood that the properties of the resinous bodies, especially the solubility thereof, not only depend upon the components used in the condensation process but also upon the temperature and duration of the heating treatment. The solubility is strongly influenced by the colloid state of the resinous body and, therefore, resinous compounds easily soluble in all solvents as well as compounds sparingly soluble in drying oils but readily soluble in other solvents may be obtained. However, a typical feature of this invention consists in the solubility of the products obtained.

The resinous bodies of our invention can be used in various ways; they are particularly suitable for being employed in the manufacture of lacquers and varnishes, both as a base for the manufacture of oil-resin varnishes and in admixture with cellulose ester lacquers or in admixture with other oil-resin varnishes, the physical properties of which are considerably improved.

In order to illustrate more fully our invention we give the following examples; but the invention is not limited to these examples, for obvious modifications may occur to a person skilled in the art as to the ratio of the components to each other and the conditions of the condensation process. Although in the following examples only anhydrides of polybasic acids are used, we wish it to be understood that the corresponding acids and other derivatives, such as chlorides or esters thereof, are likewise suitable to carry out the process of our invention. The parts are by weight.

Example 1

2875 parts of rosin (acid number 164) and 945 parts of glycerine are esterified at a temperature of about 200–210° C. in the well known way, then 1250 parts of phthalic anhydride are added and the mixture further heated while slowly raising the temperature up to 250° to 260° C., until an acid number of 9 is obtained. A pale, hard, resinous body results, having a softening point of 85° C. (Kraemer-Sarnow test) and being readily soluble in acetone, aromatic hydrocarbons, benzene alcohol mixture (1:1), ethyl acetate and other acetic acid esters and in drying and non-drying oils.

Example 2

100 parts of a mixture consisting of 40 percent of glycerine monobenzoate and 60 percent of glycerine dibenzoate are heated together with 38 parts of phthalic anhydride at 170 to 180° C. for 3½ hours. The resulting light brownish, soft, strongly adherent resinous compound is readily soluble in the usual solvents for cellulose ester lacquers.

Example 3

120 parts of linseed oil acid monoglyceride (produced either by causing linseed oil to exchange its acid radicals with glycerine or by esterifying linseed oil acids with glycerine) are mixed with 50 parts of phthalic anhydride, heated for 5 hours to 170 to 180° C. and then for a further 1½ hours to 220 to 230° C. After this treatment the acid number has fallen to about 5 and only traces of free phthalic acid may be detected. The resulting product is a light brownish, thickly liquid mass, soluble in drying and non-drying oils and the solvents and thinners used in the manufacture of cellulose ester lacquers.

Example 4

282 parts of linseed oil acid and 92 parts of glycerine are heated for 3 hours to 170 to 180° C. and then the temperature is gradually raised to 220 to 230° C., while continually introducing carbon dioxide gas. After cooling down to about 170° C. 148 parts of phthalic anhydride are added, the temperature being again raised to about 230° C. for 3 hours. A thickly liquid, light brownish, resinous mass, soluble like the product of Example 3, is obtained, which dries with or without driers and yields an enamel-like film.

Example 5

0.05 part of calcium glycerate are added to 872 parts of linseed oil and 276 parts of glycerine and the mixture heated to 250 to 280° C. for about two hours, in which time a mixture of linseed oil acid monoglyceride and free glycerine is produced. 518 parts of phthalic anhydride are added to the mixture cooled down to about 195° C. and then the temperature is slowly raised (within two hours) up to about 300° C. at which it is maintained for one hour. After heating has been interrupted, a stream of an inert gas, such as nitrogen or carbon dioxide, is blown through the mixture until the acid number has attained the value of about 10.

After cooling a clear, light yellowish, tenacious, gumlike resinous compound is obtained which is insoluble in ether-alcohol (1:1), but easily soluble in aromatic hydrocarbons, ethyl acetate, butyl acetate, amyl acetate, acetone, glycol ethers, cyclohexanol, cyclohexanone, and chlorinated hydrocarbons, for example, carbon tetrachloride or chloroform, and may also be dissolved in drying and non-drying oils. This resinous compound is especially suited to be used for nitrocellulose lacquers.

Example 6

872 parts of linseed oil, 124 parts of ethylene glycol and 0.6 part of calcium glycolate are heated to 200-205° C. for about 3 hours. A following treatment with 222 parts of phthalic anhydride as shown in Example 5 yields a clear, light yellow, soft, liquid resinous body of strong adherence, the solubility of which is analogous to the product of Example 5. Acid number: 9.

Example 7

436 parts of linseed oil, 91 parts of mannite (mannitol) and 0.2 part of calcium glycerate are heated to about 250° C. for about four hours. Then 185 parts of phthalic anhydride are added and the mixture is further heated to about 300° C. for two hours. A very thickly liquid, light brown, strongly adherent resinous body is obtained.

In order to illustrate the use of the resinous bodies as referred to above, the following typical compositions of matter are given:

(1) 60 parts of linseed oil are boiled at a temperature of 320° C. until the iodine number has fallen to 80 to 120, allowed to cool down to 120 to 150° C. and added to 60 parts of the resinous compound obtained according to Example 1 and melted at 150 to 180° C. The temperature is then gradually raised to 300° C. until a sample taken from the mixture is completely transparent after having cooled down. The mixture is allowed to cool down to about 100° C. and mixed with 48 parts of white spirit (Abel test 30) and 6 parts of a cobalt drier solution containing 1.5 percent of Co. A varnish is thus obtained adhering strongly to iron and yielding a very tenacious hard film within the usual time of drying.

(2) 40 parts of linseed oil are boiled as shown in the foregoing paragraph, and mixed with 160 parts of crude China wood oil. This mixture is added to 100 parts of a resinous compound obtained according to Example 1 and melted at about 180° C. A following heating to 330° C. is continued until a sample taken from the mixture is completely transparent after having cooled down. After having allowed to cool down to about 100° C., the mixture is mixed with 125 parts of white spirit (Abel test 30) and 20 parts of a cobalt drier solution containing 1.5 percent of Co. The varnish thus prepared is analogous to that obtained according to the foregoing paragraph.

(3) 8 parts of the resinous compound obtained according to Example 5, 8 parts of nitrocellulose, 4 parts of camphor and 7.2 parts of castor oil are dissolved in a mixture of 44 parts of butyl acetate and 44 parts of ethyl alcohol. A nitrocellulose lacquer is obtained, yielding coatings of an excellent adherence to metallic surfaces and a high luster. The admixture of the resinous compound has been found to considerably increase the hardness and elasticity of the film. If desired, the velocity of hardening may be enhanced by adding to the lacquer 0.4 part of a cobalt drier solution containing 0.8 percent of Co.

(4) 50 parts of the resinous compound obtained according to Example 5 are dissolved in 50 parts of benzene and 5 parts of a cobalt drier solution containing 1.5 percent Co are added to the mixture. The coatings produced by 'this varnish possess a normal drying time, a good adherence also to metallic surfaces, an excellent hardness and a considerable resistance to the influence of weather.

It is to be understood that these typical examples may be varied in different manners, especially that pigments may be incorporated in the varnishes or lacquers by well known methods, that other resins may be present together with the resinous bodies of this invention and that also other plasticizers usual in the manufacture of cellulose ester lacquers may be employed in addition to the resinous compounds of this invention.

In the following claims the term "compound containing the radical of an organic polybasic acid" is intended to comprise an organic polycarboxylic acid or a derivative thereof such as anhydride, chloride, ester, etc., which is capable of entering into the polyhydric alcohol-polybasic acid reaction; the term "radical of a polyhydric alcohol" is intended to comprise radicals of alcohols containing a plurality of hydroxy groups, at least some of the carbon atoms of which are linked with each other, for example, the glycolyl or the glyceryl residue; and the term "radical of a monobasic organic acid" is intended to mean an acyl group R.CO (R being any aliphatic, or aromatic or natural resin acid residue).

We claim:

1. In processes of producing resinous bodies by condensation of a polyhydric alcohol with a compound containing the radical of an organic polybasic acid, and a monobasic organic acid, the step which consists in first esterifying partially the polyhydric alcohol with the monobasic acid and then condensing the partially acylated polyhydric alcohol with the compound containing the radical of an organic polybasic acid.

2. In processes of producing resinous bodies by condensation of a polyhydric alcohol with phthalic anhydride and a monobasic organic acid, the step which consists in first esterifying partially the polyhydric alcohol with a resinous monobasic acid and then condensing the partially acylated polyhydric alcohol with phthalic anhydride.

3. In processes of producing resinous bodies, the step which consists in first converting a polyhydric alcohol totally acylated with a monobasic organic acid into a partially acylated polyhydric alcohol by alcoholysis and then condensing the partially acylated polyhydric alcohol with a compound containing the radical of an organic polybasic acid.

4. In processes of producing resinous bodies, the step which consists in first converting a drying oil into partially acylated glycerides by alcoholysis and then condensing the partially acylated glycerides with phthalic anhydride.

5. In processes of producing resinous bodies, the step which consists in first converting linseed oil into partially acylated glycerides and then condensing the partially acylated glycerides with phthalic anhydride.

6. In processes of producing resinous bodies, the step which consists in first converting linseed oil into its corresponding monoglyceride by alcoholysis with a polyhydric alcohol and then condensing this monoglyceride with phthalic anhydride.

7. In processes of producing resinous bodies, the step which consists in first converting linseed oil into partially acylated glycerides by heating it with glycerine and a small quantity of calcium glycerate for 2 to 5 hours at a temperature of about 250 to 280° C. and then condensing the mixture with phthalic anhydride.

8. In processes of producing resinous bodies, the step which consists in first converting a polyhydric alcohol totally acylated with a monobasic organic acid into a partially acylated polyhydric alcohol by alcoholysis with a quantity of polyhydric alcohol larger than calculated to convert the totally acylated polyhydric alcohol into its monoacylated derivative and then condensing the mixture of said monoacylated derivative and free polyhydric alcohol with a compound containing the radical of an organic polybasic acid.

9. In processes of producing resinous bodies, the step which consists in first converting a triglyceride into a monoglyceride by alcoholysis with a quantity of a polyhydric alcohol larger than calculated to convert the triglyceride into a monoglyceride and then condensing the mixture of monoglyceride, partially acylated and free polyhydric alcohol with phthalic anhydride.

10. In processes of producing resinous bodies, the step which consists in first converting a drying oil into its corresponding monoglyceride by alcoholysis with a quantity of glycerine larger than calculated to convert the drying oil into its corresponding monoglyceride and then condensing the mixture of monoglyceride and free glycerine with phthalic anhydride.

11. In processes of producing resinous bodies, the step which consists in first converting linseed oil into its corresponding monoglyceride by heating it with a quantity of glycerine larger than calculated to convert the linseed oil into its corresponding monoglyceride for 2 to 5 hours at a temperature of about 250 to 280° C. and then condensing the resulting mixture of linseed oil acid monoglyceride and free glycerine with phthalic anhydride.

12. In processes of producing resinous bodies, the step which consists in first converting linseed oil into its corresponding monoglyceride by heating it with a quantity of glycerine larger than calculated to convert the linseed oil into its corresponding monoglyceride for two to five hours at a temperature of about 250 to 280° C., then condensing the resulting mixture of linseed oil acid monoglyceride and free glycerine with phthalic anhydride at a temperature ranging from about 195 to 300° C. and at last blowing an inert gas into the hot resinous mixture.

13. The method of producing modified polyhydric alcohol-polybasic acid resins, which comprises heating a partially acylated polyhydric alcohol, containing a monobasic aliphatic acid radical, with an organic polybasic acid.

14. The method of producing modified polyhydric alcohol-polybasic acid resins, which comprises heating a partially acylated polyhydric alcohol, containing a monobasic aliphatic acid radical, with phthalic anhydride.

15. The method of claim 13, in which the polyhydric alcohol is glycerol.

16. The method of claim 14, in which the polyhydric alcohol is glycerol.

17. The method of claim 13, in which the partially acylated polyhydric alcohol is a fatty glyceride.

18. The method of claim 14, in which the partially acylated polyhydric alcohol is a fatty glyceride.

19. The method of claim 13, in which the partially acylated polyhydric alcohol is a drying oil glyceride.

20. The method of claim 14, in which the partially acylated polyhydric alcohol is a drying oil glyceride.

21. The method of claim 13, in which the partially acylated polyhydric alcohol is a linseed glyceride.

22. The method of claim 14, in which the partially acylated polyhydric alcohol is a linseed glyceride.

23. The method of claim 13, in which the partially acylated polyhydric alcohol is a China wood glyceride.

24. The method of producing modified polyhydric alcohol-polybasic acid resins, which comprises heating a polyhydric alcohol and a monobasic aliphatic acid to effect partial esterification of the polyhydric alcohol, and thereafter heating the reaction product with an organic polybasic acid.

25. The method of producing modified polyhydric alcohol-polybasic acid resins, which comprises heating a polyhydric alcohol and a monobasic aliphatic acid to effect partial esterification of the polyhydric alcohol, and thereafter heating the reaction product with phthalic anhydride.

26. The method of producing modified polyhydric alcohol-polybasic acid resins, which comprises heating a partially acylated polyhydric alcohol with an organic polybasic acid, the partial acylation of the polyhydric alcohol having been effected with rosin.

27. The method of producing modified polyhydric alcohol-polybasic acid resins, which comprises heating a partially acylated polyhydric alcohol with phthalic anhydride, the partial acylation of the polyhydric alcohol having been effected with rosin.

28. A composition of matter comprising a resinous body being composed of the radicals of a polyhydric alcohol, an organic polybasic acid and a monobasic organic acid, and being produced by first preparing a partially acylated polyhydric alcohol and then condensing this partially acylated alcohol with a compound containing the radical of an organic polybasic acid.

29. The process which comprises combining a polyhydric alcohol with an oil having drying properties, adding a polybasic organic acid to the combination and esterifying the entire mass.

30. The process which comprises treating an oil having drying properties with a polyhydric alcohol at a temperature sufficient to cause reaction therebetween and to produce a clear mass and then treating said mass with a polybasic organic acid at a temperature sufficient to cause esterification of the entire mass and to form a resinous product.

31. The process of making a resinous condensation product which comprises heating glycerol and linseed oil until sufficient reaction takes place to cause the two phases present to merge into a single phase, and then heating the product thus obtained with phthalic anhydride until resinification occurs.

32. The process of preparing synthetic resins which comprises the alcoholysis of linseed oil with a polyhydric alcohol and the esterification of the resulting product with phthalic anhydride.

33. A resinous condensation product of phthalic anhydride and the reaction product of glycerol and linseed oil.

34. The process which comprises adding a polybasic organic acid to a monoglyceride of the acids of a vegetable oil having drying properties, and esterifying the reaction mixture.

35. The process which comprises adding a polybasic organic acid to a mixture of mono- and diglycerides of the acids derived from a fatty oil having drying properties, and esterifying the reaction mixture.

36. The process which comprises heating a mixture containing a polybasic organic acid with a glyceride of the acids of a vegetable oil having a glycerol content greater than that of the triglyceride, until a resinous condensation product is produced.

37. A resinous condensation product of phthalic anhydride with a monoglyceride of the acids derived from a fatty oil having drying properties.

38. A resinous condensation product of phthalic anhydride with a mixture of mono- and diglycerides of the acids of a vegetable oil having drying properties.

39. A resinous condensation product of phthalic anhydride with a glyceride of the acids of a vegetable oil having a glycerol content greater than that of the triglyceride.

KARL OTT.
HANNS BERNARD.
FRIEDRICH FRICK.

CERTIFICATE OF CORRECTION.

Patent No. 2,044,747. June 16, 1936.

KARL OTT, ET AL.

It is hereby certified that error appears in the above numbered patent requiring correction as follows: In the heading to the printed specification, line 10, after Serial No. "270,792" insert the words In Germany April 25, 1927; and that the said Letters Patent should be read with this correction therein that the same may conform to the record of the case in the Patent Office.

Signed and sealed this 11th day of August, A. D. 1936.

Henry Van Arsdale

Seal) Acting Commissioner of Patents.